United States Patent
Matsushiro et al.

(10) Patent No.: US 6,972,541 B2
(45) Date of Patent: Dec. 6, 2005

(54) INVERTER CONTROL DEVICE FOR DRIVING A MOTOR AND AN AIR CONDITIONER

(75) Inventors: Hideo Matsushiro, Kusatsu (JP); Mitsuo Kawaji, Sakata-gun (JP); Tomohiro Sugimoto, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 106 days.

(21) Appl. No.: 10/809,485

(22) Filed: Mar. 26, 2004

(65) Prior Publication Data

US 2004/0232876 A1 Nov. 25, 2004

(30) Foreign Application Priority Data

Mar. 27, 2003 (JP) ............................. 2003-088439
Feb. 27, 2004 (JP) ............................. 2004-054287

(51) Int. Cl.[7] ............................................. H02P 5/28
(52) U.S. Cl. ...................... 318/801; 318/800; 318/806; 318/812
(58) Field of Search ................. 318/800, 803, 318/806, 811, 812, 817

(56) References Cited

U.S. PATENT DOCUMENTS

| | | | | | |
|---|---|---|---|---|---|
| 4,992,718 | A | * | 2/1991 | Kumaki | 318/768 |
| 5,206,575 | A | * | 4/1993 | Nakamura et al. | 318/807 |
| 5,457,375 | A | * | 10/1995 | Marcinkiewicz et al. | 318/802 |
| 5,561,595 | A | * | 10/1996 | Smith | 363/37 |
| 6,002,218 | A | * | 12/1999 | Toda et al. | 318/66 |
| 6,191,545 | B1 | * | 2/2001 | Kawabata et al. | 318/439 |
| 6,229,278 | B1 | * | 5/2001 | Garces et al. | 318/801 |
| 6,337,548 | B2 | * | 1/2002 | Kawabata et al. | 318/439 |
| 6,414,455 | B1 | * | 7/2002 | Watson | 318/432 |
| 6,489,692 | B1 | * | 12/2002 | Gilbreth et al. | 290/52 |
| 6,512,341 | B2 | * | 1/2003 | Matsushiro et al. | 318/254 |
| 6,822,417 | B2 | * | 11/2004 | Kawaji et al. | 318/701 |
| 2004/0124807 | A1 | * | 7/2004 | Nakata et al. | 318/801 |
| 2004/0207360 | A1 | * | 10/2004 | Matsushiro et al. | 318/811 |
| 2004/0228151 | A1 | * | 11/2004 | Matsushiro et al. | 363/37 |
| 2004/0232877 | A1 | * | 11/2004 | Kawaji et al. | 318/802 |
| 2004/0246641 | A1 | * | 12/2004 | Sugimoto et al. | 361/91.1 |
| 2005/0007061 | A1 | * | 1/2005 | Hofmann et al. | 318/701 |

FOREIGN PATENT DOCUMENTS

| | | | |
|---|---|---|---|
| JP | 9-266674 | 10/1997 | |
| JP | 11308894 A | * 11/1999 | ............. H02P/7/63 |
| WO | WO 3081765 A1 | * 10/2003 | ........... H02P/21/00 |

* cited by examiner

*Primary Examiner*—David Martin
*Assistant Examiner*—Patrick Miller
(74) *Attorney, Agent, or Firm*—Wenderoth, Lind & Ponack, L.L.P.

(57) ABSTRACT

An inverter control device for driving a motor with small size, light weight and low cost is provided. The inverter control device generates PN voltage correction coefficient by dividing the reference DC voltage by the detected DC voltage, and corrects the voltage command of each phase by multiplying the voltage command of each phase obtained by the motor voltage command generator with the PN voltage correction coefficient output from the PN voltage corrector, thus resulting in the corrected motor voltage command. The inverter control device has, in generating PN voltage correction coefficient, a first mode in which the PN voltage correction coefficient is set to 1 when the DC voltage value is more than the reference DC voltage, and a second mode in which the value obtained by dividing the reference DC voltage by the detected DC voltage is set to the PN voltage correction coefficient.

12 Claims, 21 Drawing Sheets

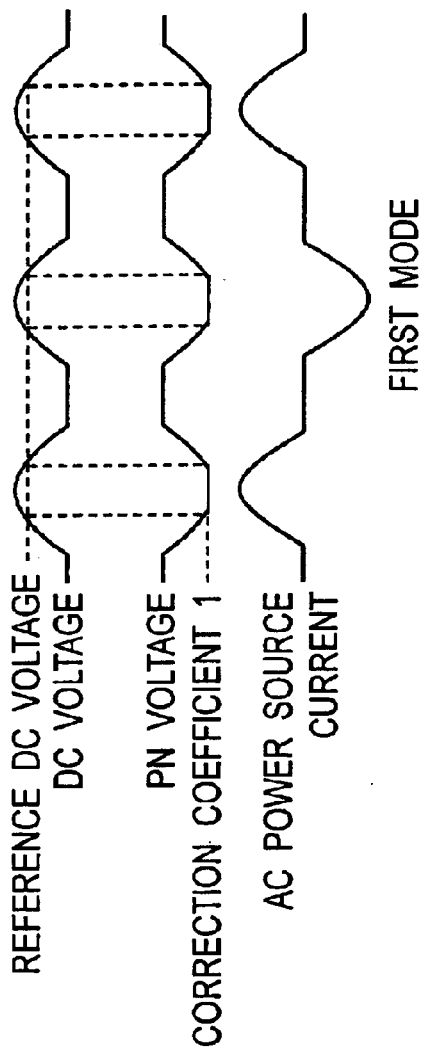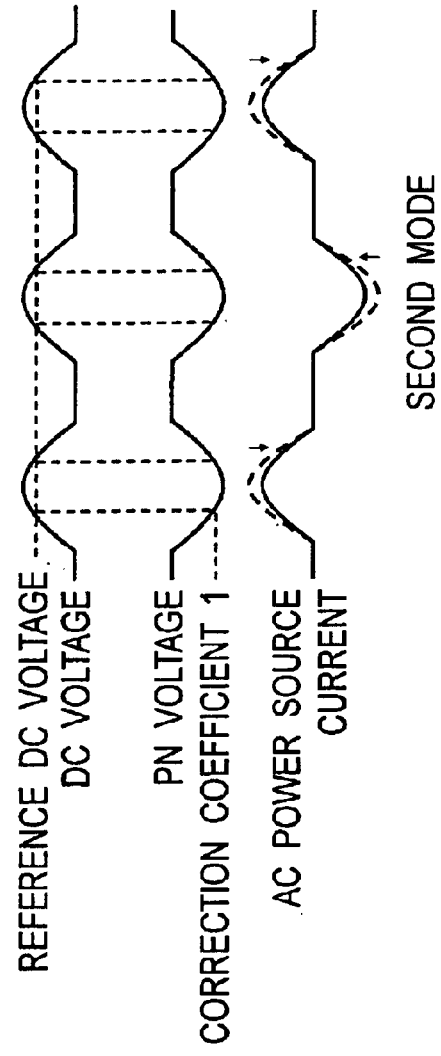

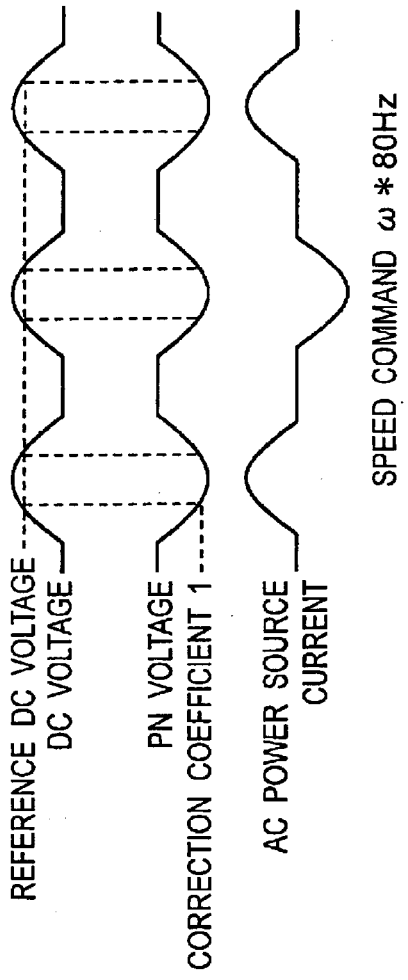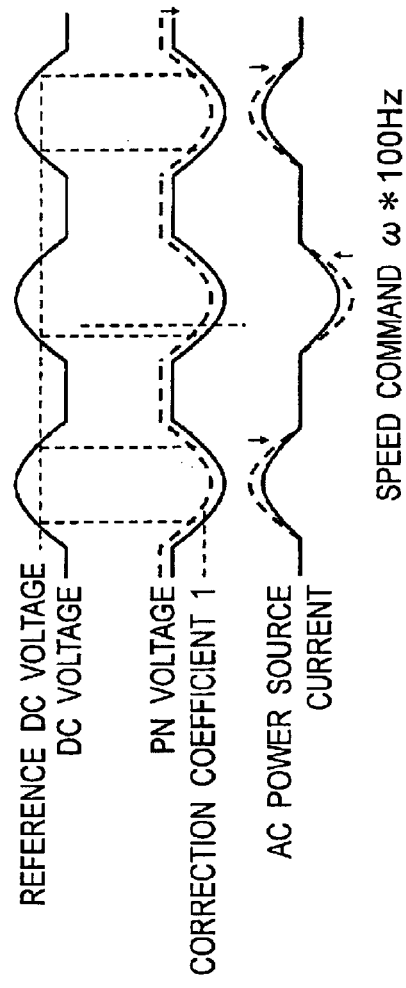
Fig.10A
Fig.10B

INVERTER CONTROL DEVICE FOR DRIVING A MOTOR AND AN AIR CONDITIONER

BACKGROUND OF THE INVENTION

1. Technical Field

The present invention relates to an inverter control device for driving a motor and an air conditioner.

2. Related Art

As an inverter control device for driving a general induction motor used in a general-purpose inverter, for example, an inverter control device for driving an induction motor of V/F controlled system as shown in FIG. 18 is known (see non-patent document 1, pages 661–711).

In FIG. 18, the main circuit is composed of a DC (direct-current) power supply apparatus 113, an inverter 3, and an induction motor 4. The DC power supply apparatus 113 includes an AC (alternating-current) power source 1, a rectifying circuit 2, a smoothing capacitor 112 for accumulating electric energy for the DC voltage source of the inverter 3, and a power factor correcting reactor 111 for the AC power source 1.

On the other hand, a control circuit is composed of a V/F control pattern section 13 for determining the motor voltage value to be applied to the induction motor 4 on the basis of a speed command ω* of the induction motor 4 given from outside, a motor voltage command generator 14 for generating a voltage command of each phase of the induction motor 4 on the basis of the motor voltage value determined in the V/F control pattern section 13, and a PWM controller 18 for generating PWM signals of the inverter 3 on the basis of each phase voltage command generated from the motor voltage command generator 14.

An example of general V/F control pattern section 13 is shown in FIG. 19.

As shown in FIG. 19, the motor voltage value to be applied to the induction motor 4 is uniquely determined corresponding to the speed command ω*. Generally, the speed command ω* and motor voltage value are stored as a table value in the memory of the processing unit such as a microcomputer, and the speed command ω* other than the table value is linearly interpolated from the table values, and then a motor voltage value is calculated.

Supposing the AC power source 1 to be 220 V (AC power source frequency 50 Hz), the input of the inverter 3 to be 1.5 kW, and the smoothing capacitor 112 to be 1500 μF, the relation of the harmonic components of the AC power source current and the degree about the AC power source frequency at 5 mH and 20 mH of the power factor correcting reactor 111 is shown in FIG. 20. FIG. 20 also shows the standard of IEC (International Electrotechnical Commission), in which the cubic harmonic component largely exceeds the IEC standard when the power factor correcting reactor 111 is 5 mH, but higher harmonic components of up to the degree of 40 satisfy the IEC standard at 20 mH.

Therefore, to conform to the IEC standard at high load, in particular, the inductance value of the power factor correcting reactor 111 must be further increased, and the inverter device is increased in size and weight, and the cost is also increased.

Accordingly, as an attempt to suppress increase of inductance value of the power factor correcting reactor 111, and reduce the power source harmonic components and heighten the power factor, a DC power supply unit as shown in FIG. 21 is proposed (for example, see patent document 1).

In FIG. 21, an AC supply voltage of the AC power source 1 is applied to an AC input terminal of a full-wave rectifying circuit composed of bridge connection of diodes D1 to D4, and its output is charged into an intermediate capacitor C by way of a reactor Lin, and the electric charge of this intermediate capacitor C is discharged into a smoothing capacitor CD, and a DC voltage is applied to a load resistance RL. In this case, a transistor Q1 is connected to positive and negative DC current paths connecting the load side of the reactor Lin and the intermediate capacitor C, and this transistor Q1 is driven by a base driving circuit G1.

The DC power supply apparatus further includes pulse generating circuits I1 and I2 for applying a pulse voltage to the base driving circuit G1, and a dummy resistance Rdm. The pulse generating circuits I1, I2 are composed of a circuit for detecting the zero cross point of AC supply voltage, and a pulse current circuit for causing a pulse current to flow through the dummy resistance Rdm until the momentary value of the AC supply voltage becomes equal to the voltage across the intermediate capacitor C from the time zero cross point is detected.

Herein, the pulse generating circuit I1 generates a pulse voltage in the front half of a half cycle of the AC supply voltage, and the pulse generating circuit I2 generates a pulse voltage in the latter half of a half cycle of the AC supply voltage.

When flowing a current by force to the reactor Lin by turning on the transistor Q1, a reverse flow preventive diode D5 is connected so that the electric charge in the intermediate capacitor C may not be discharged through the transistor Q1, and further in the path of discharging the electric charge of the intermediate capacitor C into the smoothing capacitor, a reverse flow preventive diode D6 and a reactor Ldc for enhancing the smoothing effect are connected in series.

In this configuration, by turning on the transistor Q1 in part or all of a phase interval in which the momentary value of the AC supply voltage does not exceed the voltage across the intermediate capacitor C, reduction of harmonic components and improvement of power factor can be achieved while preventing the device size from increasing.

Non-patent document 1: Inverter Drive Handbook (ed. by Inverter Drive Handbook Editors Committee, first edition, 1995, Nikkan Kogyo Shimbunsha).

Patent document 1: Japanese Laid-open Patent Publication No. 9-266674.

In the conventional configuration, however, large capacity of the smoothing capacitor CD and reactor Lin are still required (patent document 1 discloses results of simulation at 1500 μF, 6.2 mH), it also includes the intermediate capacitor C, transistor Q1, base driving circuit G1, pulse generating circuits I1, I2, dummy resistance Rdm, reverse flow preventive diodes D5, D6, and smoothing effect enhancing reactor Ldc, and therefore the device is large in size and great in the number of parts, and hence the cost is increased.

The invention is devised to solve the problems of the prior art, and it is hence an object thereof to present an inverter control device for driving a motor of small size, light weight, and low cost.

SUMMARY OF THE INVENTION

An inverter control device for driving a motor according to the invention includes a rectifying circuit for converting an AC power from an AC power source into a DC power, and an inverter for converting the DC power from the rectifying circuit into an AC power of desired frequency and desired voltage to supply the AC power to a motor. The rectifying circuit includes a diode bridge, and a reactor with a predetermined small capacity which is connected to the AC input end or DC output end of the diode bridge. A capacitor with a predetermined small capacity for absorbing the regenerative energy of the motor is provided between DC buses of the inverter. The inverter control device includes a motor voltage command generator that generates a voltage command for each phase of the motor on the basis of a speed command of the motor given from outside; a PN voltage detector that detects a DC voltage of the inverter; a reference DC voltage calculator that determines a reference DC voltage of the inverter; a PN voltage corrector; and a motor voltage command corrector. The PN voltage corrector obtains PN voltage correction coefficient by dividing the reference DC voltage by the detected DC voltage, and has a first mode which is used when the DC voltage value is more than the reference DC voltage and in which the PN voltage correction coefficient is set to 1, and a second mode in which the value obtained by dividing the reference DC voltage by the detected DC voltage is directly set to the PN voltage correction coefficient. The motor voltage command corrector corrects the voltage command of each phase by multiplying the voltage command of each phase obtained by the motor voltage command generator with the PN voltage correction coefficient which is output from the PN voltage corrector.

In this configuration, using a capacitor with small capacity and a reactor with small capacity, an inverter control device for driving a motor with small size, light weight and low cost can be realized. Further, even though the inverter DC voltage fluctuates largely and motor driving is difficult or even impossible, it is possible to select either an operating region of maintaining stable driving of the motor by operating the inverter so that the voltage applied to the motor may be almost constant, or an operating region of suppressing fluctuations of AC power source current, improving the power factor of AC power source, and suppressing particularly cubic components of harmonic components of AC power source current.

The reference DC voltage determined by the reference DC voltage calculator may be variable depending on the speed command of the motor given from outside. In this configuration, harmonic components of the AC power source current may be further suppressed.

An inverter operating frequency may be set so as to prevent the inverter operating frequency from stationary fixing in a frequency range having a predetermined margin around the resonant frequency which is a frequency of an even number multiple of AC power source frequency. In this configuration, a resonance phenomenon of inverter frequency and AC power source frequency is avoided, and therefore unstable operation of the motor is prevented and stable driving is realized.

A combination of the small capacity reactor and the small capacity capacitor may be determined so that the resonant frequency of the small capacity reactor and the small capacity capacitor is larger than 40 times of the AC power source frequency. In this configuration, harmonic components of the AC power source current are suppressed, and the IEC standard is satisfied.

The capacity of the small capacity capacitor may be determined so that the maximum value of the DC voltage elevating when the inverter is stopped is smaller than withstand voltages of electric devices included in peripheral circuits of the inverter. By determining the capacity of the small capacity capacitor so that the maximum value of the inverter DC voltage may be smaller than the withstand voltage of the driving elements, breakdown of peripheral circuits can be prevented.

The carrier frequency of the inverter may be determined so that a power factor value of the AC power source is a predetermined value. In this configuration, the predetermined power factor value of the AC power source can be satisfied, and by setting the minimum required carrier frequency, the inverter loss can be suppressed to a lowest limit.

According to the invention, a voltage command of each phase is corrected appropriately, and thus a capacitor with small capacity and a reactor with small capacity can be used. As a result, an inverter control device for driving a motor with small size, light weight and low cost can be realized. Further, even though the inverter DC voltage fluctuates largely and motor driving is difficult or even impossible, it is possible to select either an operating region of maintaining stable driving of the motor by operating the inverter so that the voltage applied to the motor may be almost constant, or an operating region of suppressing fluctuations of AC power source current, improving the power factor of AC power source, and suppressing particularly cubic components of harmonic components of AC power source current.

BRIEF DESCRIPTION OF THE DRAWINGS

FIG. 6A is a diagram showing the operation in the first mode of PN voltage corrector in the first preferred embodiment of the invention, and FIG. 6B is a diagram showing operation in the second mode in the first preferred embodiment of the invention.

FIGS. 10A and 10B are a diagram showing the operation in the second preferred embodiment of the invention.

DETAIL DESCRIPTION OF PREFERRED EMBODIMENTS

Figure 1:
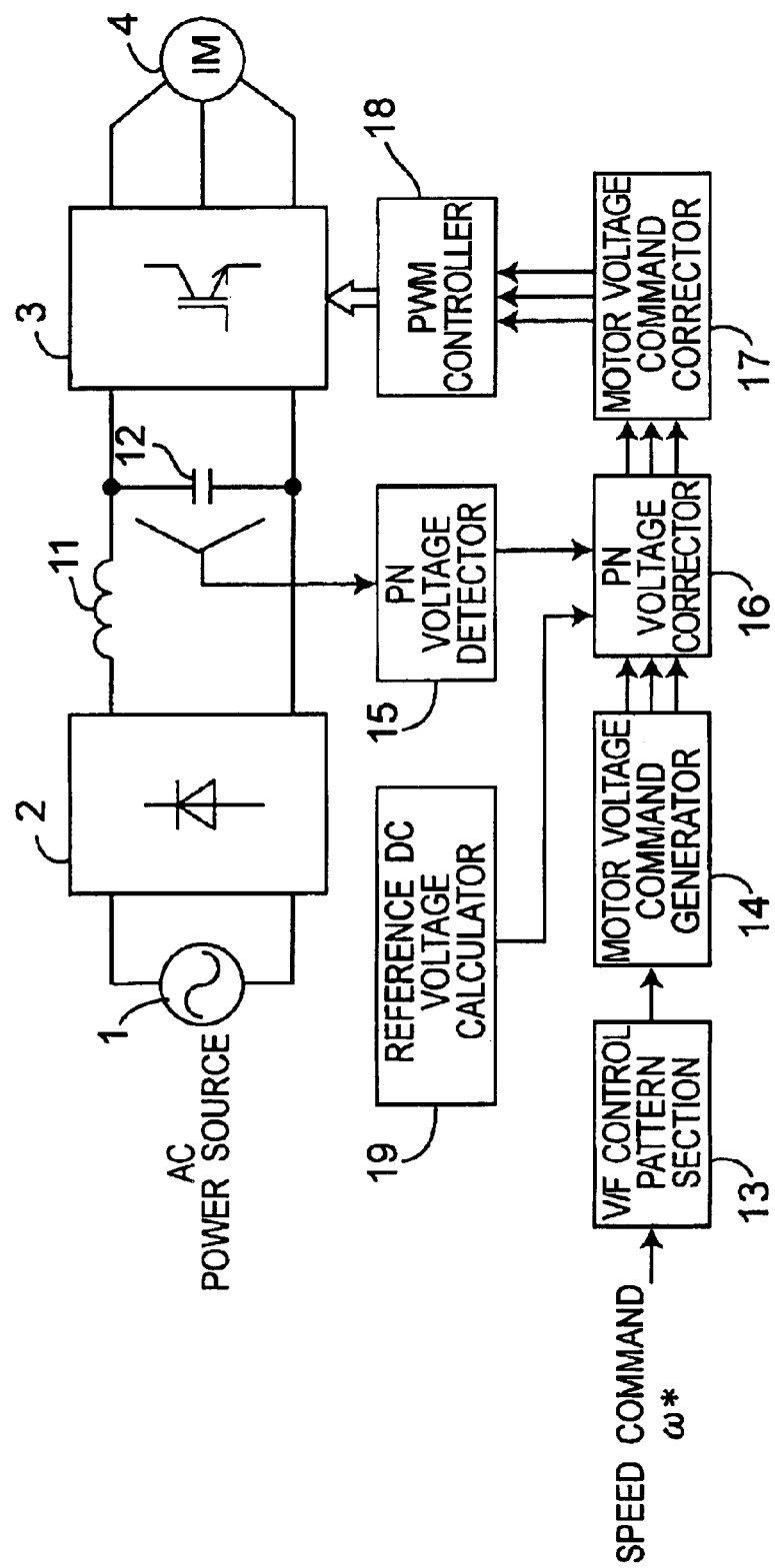
FIG. 1 is a system block diagram of an inverter control device for driving an induction motor in the first preferred embodiment of the invention.

Referring now to the drawings, preferred embodiments of the invention are described below.

Embodiment 1

FIG. 1 is a system block diagram of an inverter control device for driving an induction motor in the preferred embodiment 1 of the invention. In FIG. 1, a main circuit of the inverter control device includes an AC power source 1, a diode bridge 2 for converting the AC power into a DC power, a reactor 11 with small capacity of 2 mH or less, a capacitor 12 with small capacity of 100 $\mu$F or less, an inverter 3 for converting the DC power into the AC power, and an induction motor 4 driven by the AC power converted by the inverter 3.

On the other hand, a control circuit of the inverter control device includes a V/F control pattern section 13, a motor voltage command generator 14, a PN voltage detector 15, a PN voltage corrector 16, a motor voltage command corrector 17, a PWM controller 18, and a reference DC voltage calculator 19.

The V/F control pattern section 13 determines the motor voltage value to be applied to the induction motor 4 on the basis of the speed command $\omega^*$ of the induction motor 4 given from outside. The motor voltage command generator 14 generates voltage command for each phase of the induction motor 4 on the basis of the motor voltage value determined in the V/F control pattern section 13. The PN voltage detector 15 detects the DC voltage of the inverter 3. The reference DC voltage calculator 19 determines a reference DC voltage of the inverter 3. The PN voltage corrector 16 compares the reference DC voltage of the inverter 3 determined in the reference DC voltage calculator 19 with the detected DC voltage of the inverter 3 obtained from the PN voltage detector 15 and calculates the PN voltage correction coefficient from the result of the comparison. The motor voltage command corrector 17 multiplies the voltage command of each phase obtained from the motor voltage command generator 14 by the PN voltage correction coefficient produced from the PN voltage corrector 16 to correct the voltage command of each phase, and generates a corrected motor voltage command of the induction motor 4.

The PWM controller 18 generates a PWM signal of the inverter 3 on the basis of the corrected motor voltage command generated in the motor voltage command corrector 17.

Figure 18:
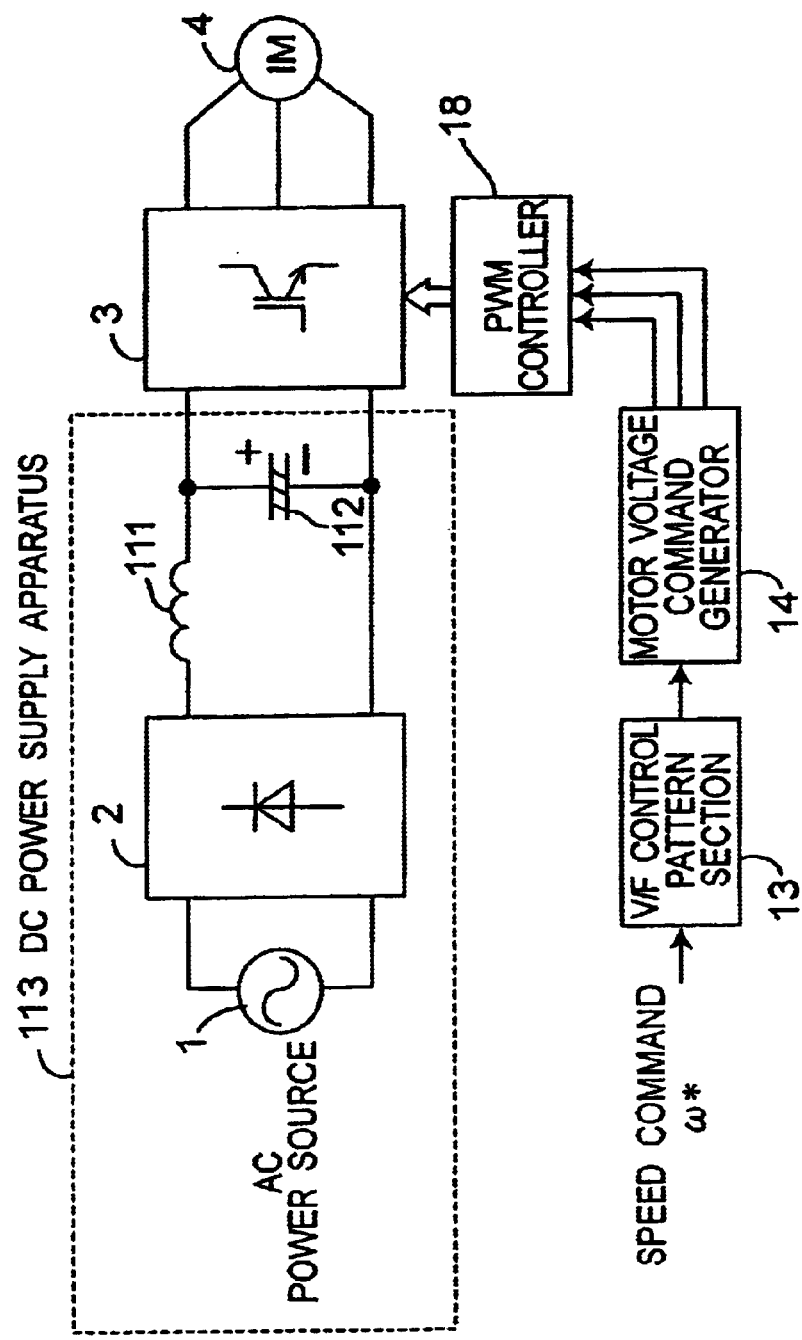
FIG. 18 is a system block diagram of a Proir Art inverter control device for driving an induction motor.
Figure 19:
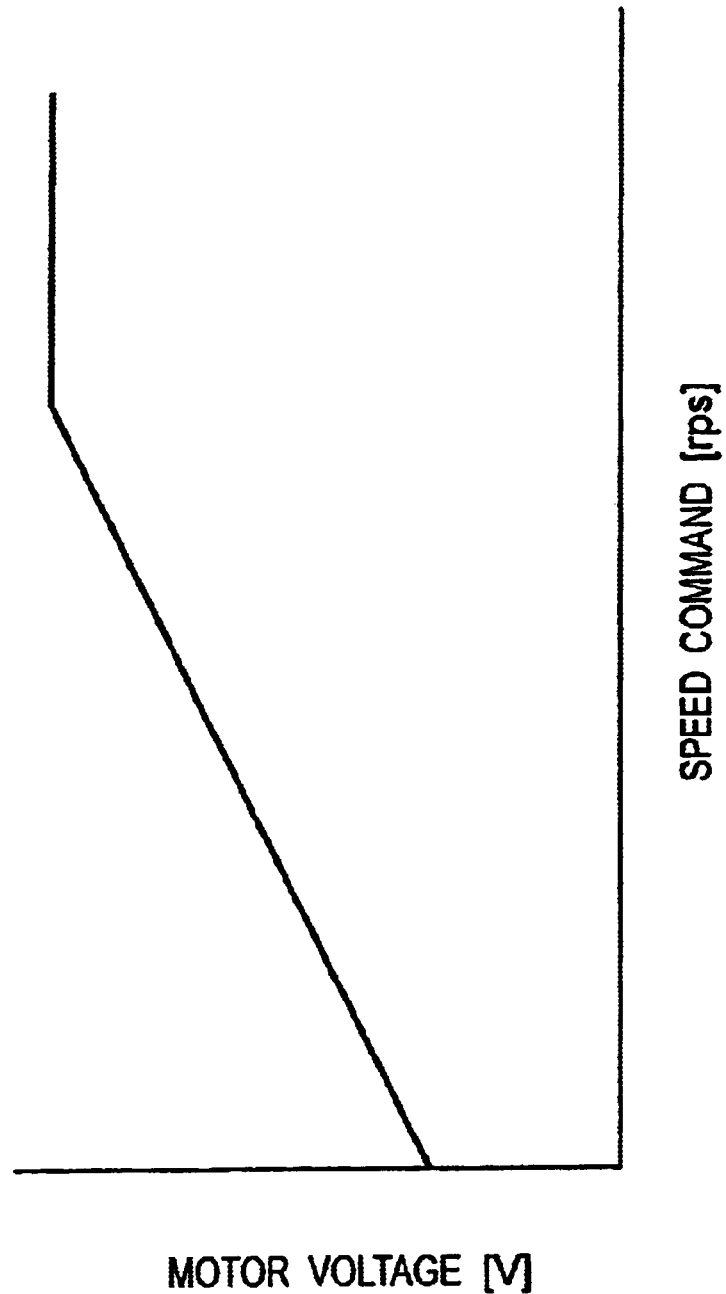
FIG. 19 is a diagram showing an example of a Prior Art V/F control pattern.
Figure 20:
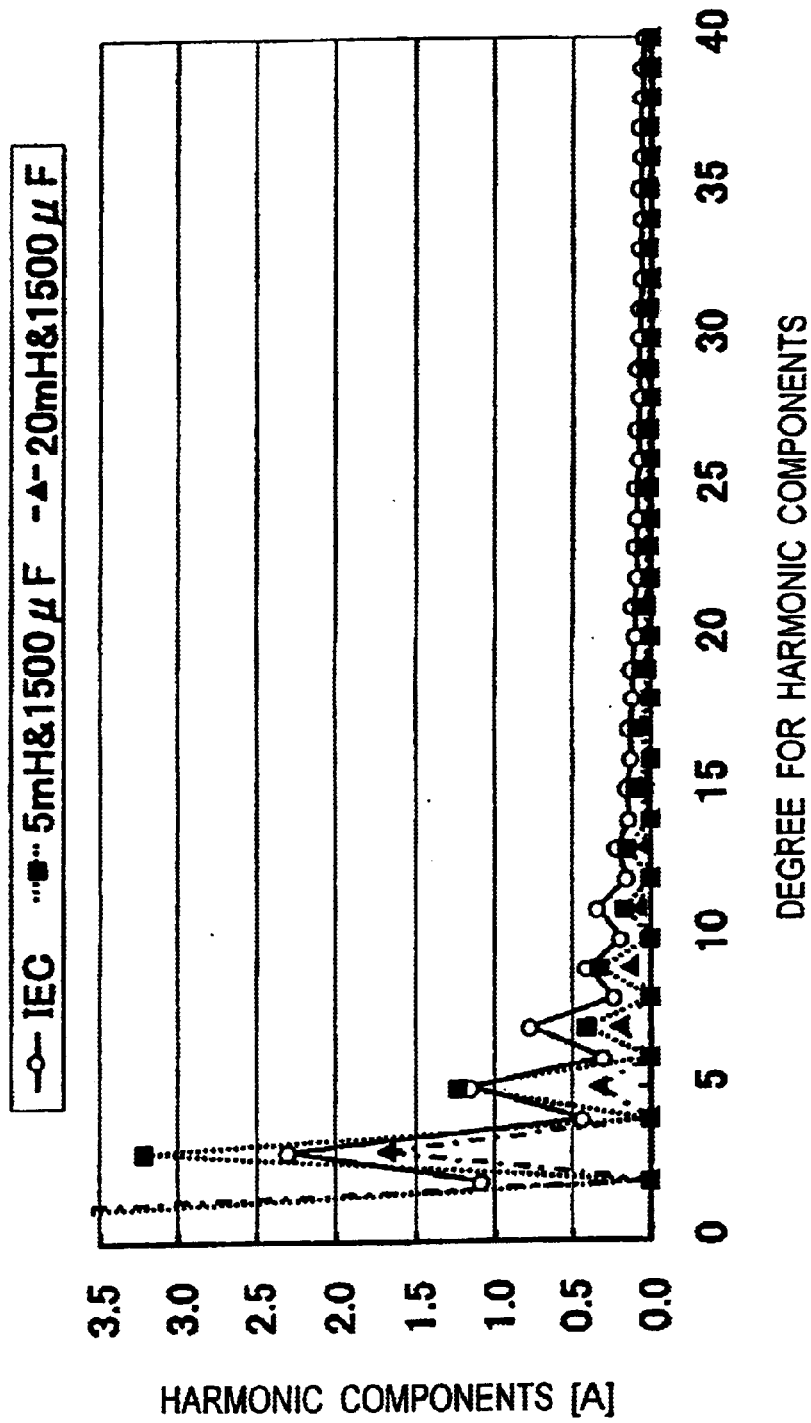
FIG. 20 is a Prior diagram showing the relation of harmonic components of the AC power source current and the degree of the AC power source frequency in the inverter control device for driving the induction motor shown in FIG. 18.
Figure 21:
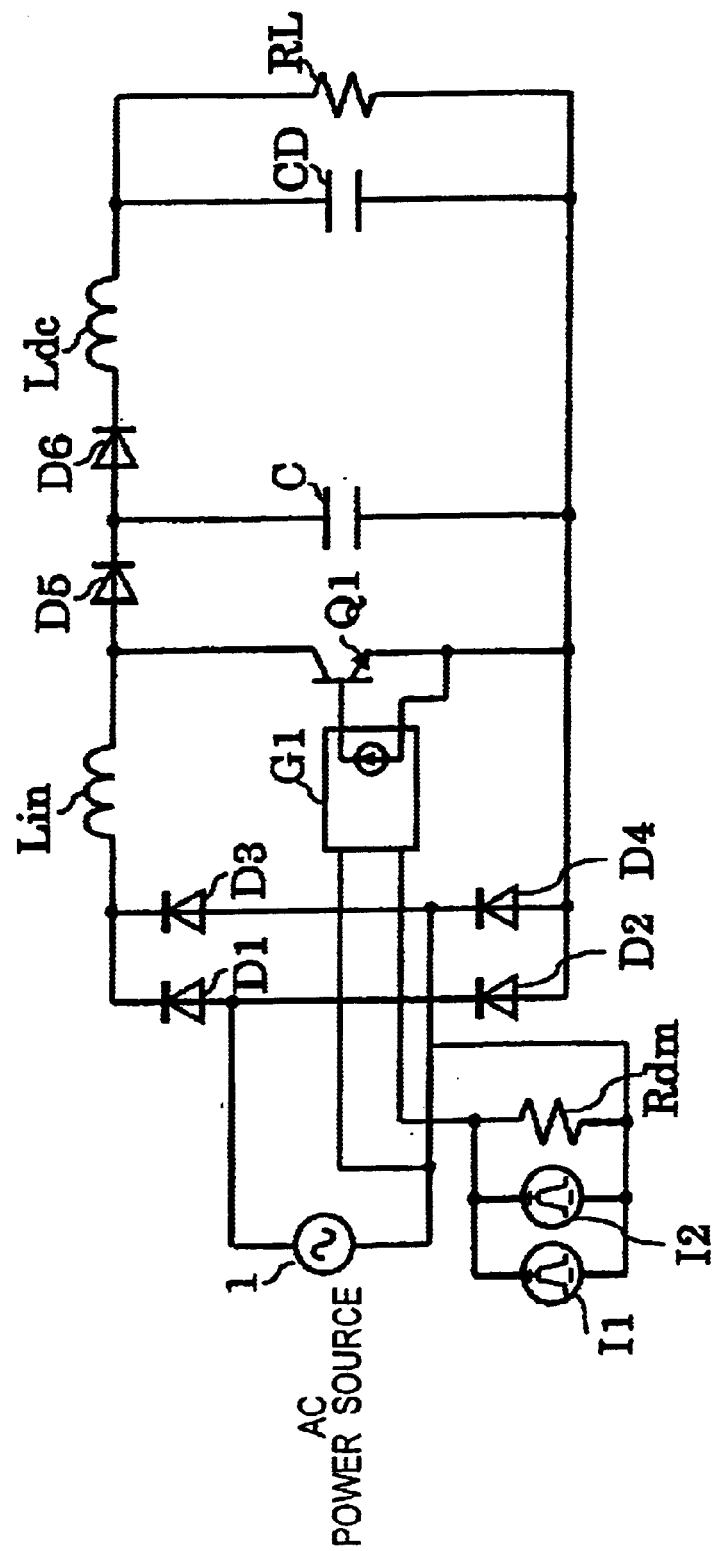
FIG. 21 is a diagram of a Prior Art DC power supply apparatus.

The V/F control pattern section 13 is explained in relation to the related art, and its explanation is omitted herein. (See the inverter control device for driving induction motor of V/F control system in FIG. 18.)

A specific operation of the inverter control device of this preferred embodiment is described below.

$$\begin{cases} V_u^* = V_m \sin\theta_1 \\ V_v^* = V_m \sin(\theta_1 - 2\pi/3) \\ V_w^* = V_m \sin(\theta_1 + 2\pi/3) \end{cases} \quad (1)$$

where $V_m$ is a motor voltage value determined by the V/F control pattern section 13, and $\theta_1$ is calculated by time integration of the speed command $\omega^*$ as expressed in formula (2).

$$\theta_1 = \int \omega^* dt \quad (2)$$

Figure 2:
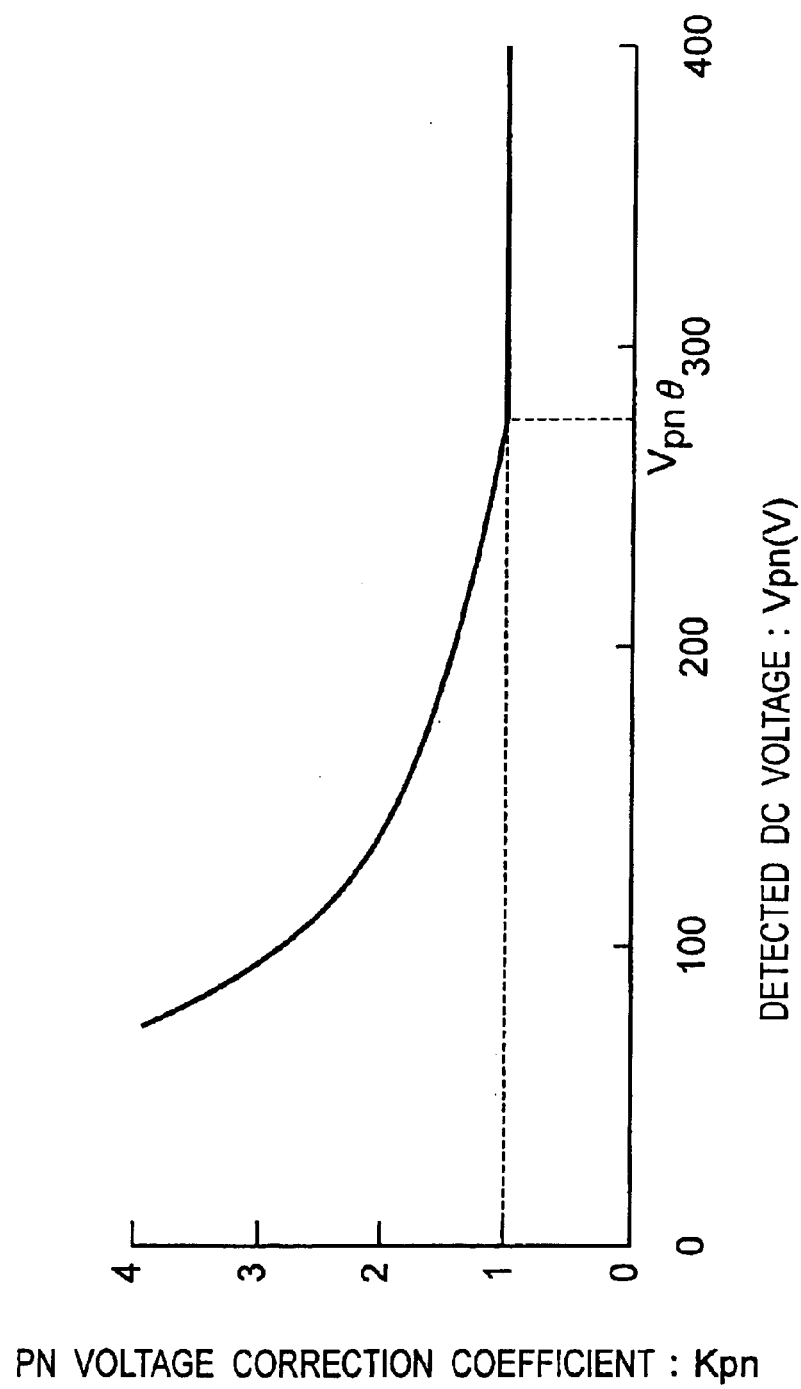
FIG. 2 is a diagram showing a first mode of PN voltage corrector in the first preferred embodiment of the invention.

The PN voltage corrector 16 has two operation modes. FIG. 2 is a diagram showing a first mode of the PN voltage corrector 16. The PN voltage corrector 16 calculates the PN voltage correction coefficient $k_{pn}$ as shown in formula (3) by using the reference DC voltage $V_{pn0}$ of the inverter 3 determined in the reference DC voltage calculator 19 and the detected DC voltage $v_{pn}$ of the inverter 3 obtained from the PN voltage detector 15.

$$k_{pn} = \begin{cases} K_{pn\_max} & (v_{pn} \leq 0) \\ V_{pn0}/v_{pn} & (0 < v_{pn} \leq V_{pn0}) \\ 1 & (v_{pn} > V_{pn0}) \end{cases} \quad (3)$$

where $k_{pn\_max}$ is the maximum value of a predetermined PN voltage correction coefficient.

Figure 3:
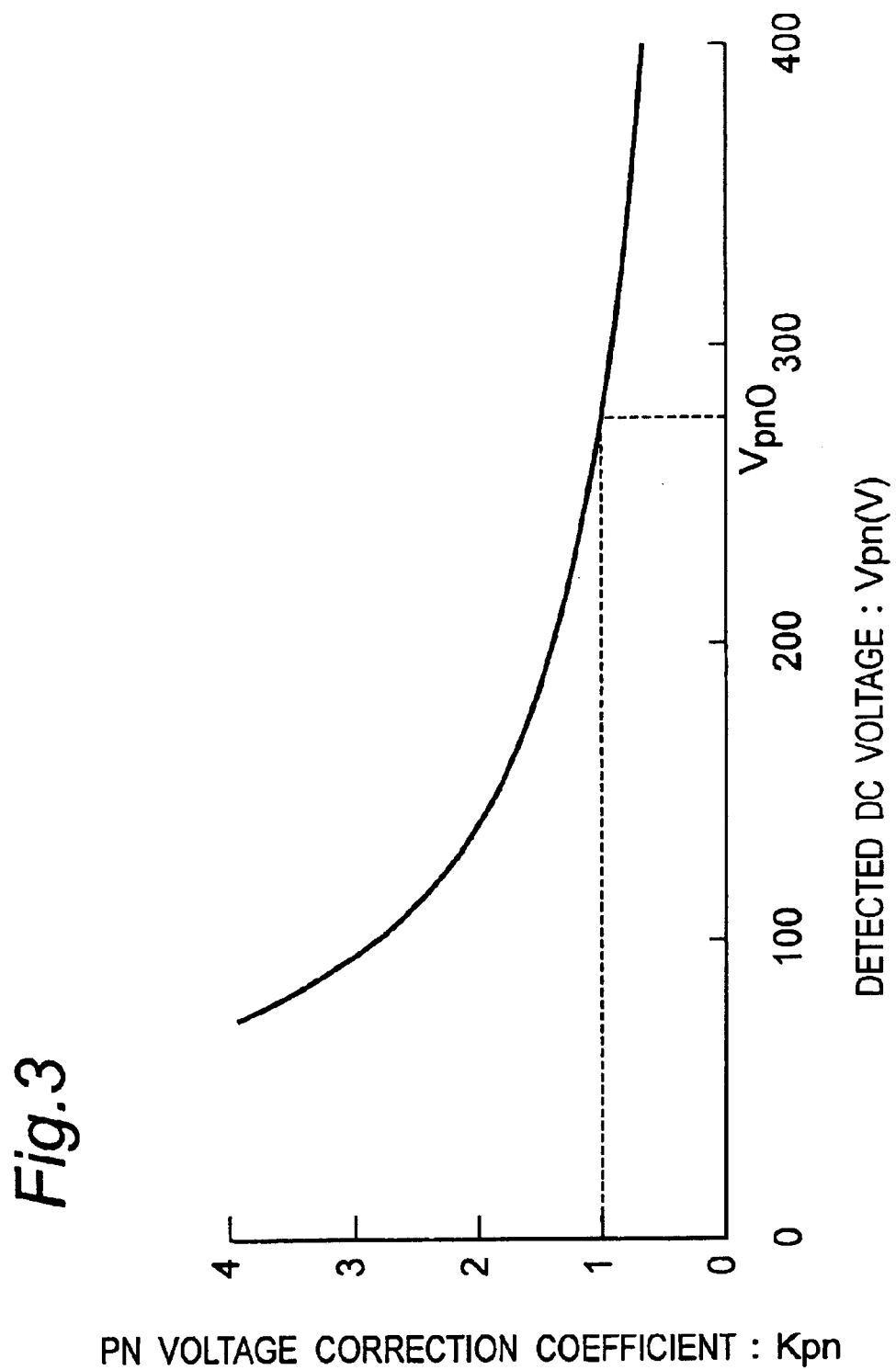
FIG. 3 is a diagram showing a second mode of PN voltage corrector in the first preferred embodiment of the invention.

FIG. 3 is a diagram showing a second mode of the PN voltage corrector 16, in which the PN voltage correction coefficient $k_{pn}$ is calculated as shown in formula (4).

$$k_{pn} = \begin{cases} K_{pn\_max} & (v_{pn} \leq 0) \\ V_{pn0}/v_{pn} & (0 < v_{pn} \leq V_{pn0}) \end{cases} \quad (4)$$

The motor voltage command corrector 17 calculates corrected motor voltage commands $v_{uh}^*$, $v_{vh}^*$, $v_{wh}^*$ as shown in formula (5) by using phase voltage commands $v_u^*$, $v_v^*$, $v_w^*$ and PN voltage correction coefficient $k_{pn}$.

$$\begin{cases} v_{uh}^* = k_{pn} \cdot v_u^* \\ v_{vh}^* = k_{pn} \cdot v_v^* \\ v_{wh}^* = k_{pn} \cdot v_w^* \end{cases} \quad (5)$$

Thus, the inverter control device of the preferred embodiment controls the voltage command of each phase by using the PN voltage correction coefficient. Hence even if the PN voltage fluctuates, a nearly constant voltage can be applied, and a capacitor of large capacity is not needed, and a capacitor of small capacity can be used. Moreover, by using the small capacity capacitor, the input current is always supplied into the motor, and the power factor of the input current increases, so that the reactor can be reduced in size. Use of the small capacity reactor and small capacity capacitor can provide an induction control device for driving an induction motor with small size, light weight and low cost. Thus, even if the inverter DC voltage fluctuates largely and driving of induction motor is difficult or impossible, the inverter can be operated so that the voltage applied to the induction motor may be almost constant, and driving of the induction motor may be maintained.

The first mode and second mode of the PN voltage corrector 16 are more specifically described below.

It is generally known that the output torque of an induction motor is proportional to the square of a voltage applied to a motor (see, for example, page 33 of non-patent document 1), and therefore it is required to retain the motor applied voltage in order to avoid shortage of limit load tolerance of the induction motor.

Hence, in order to maintain stable driving of the induction motor 4, decrease of motor applied voltage is prevented and the output torque is assured by the first mode of the PN voltage corrector 16 in which the PN voltage correction coefficient $k_{pn}$ is fixed at 1 during an interval where the detected DC voltage $v_{pn}$ is larger than the reference DC voltage $V_{pn0}$.

Figure 4:
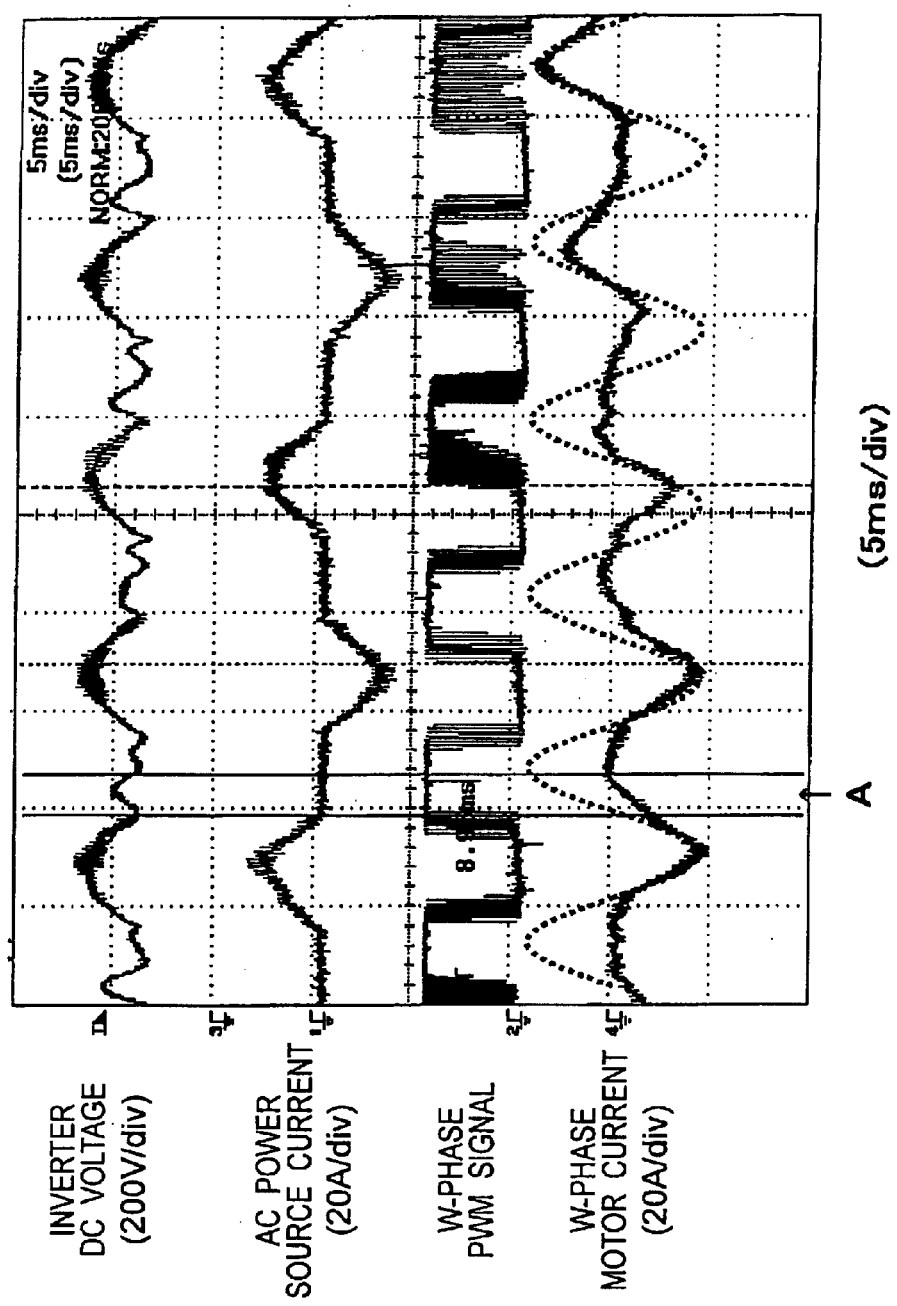
FIG. 4 is a diagram showing an operation results in the first preferred embodiment of the invention.
Figure 5:
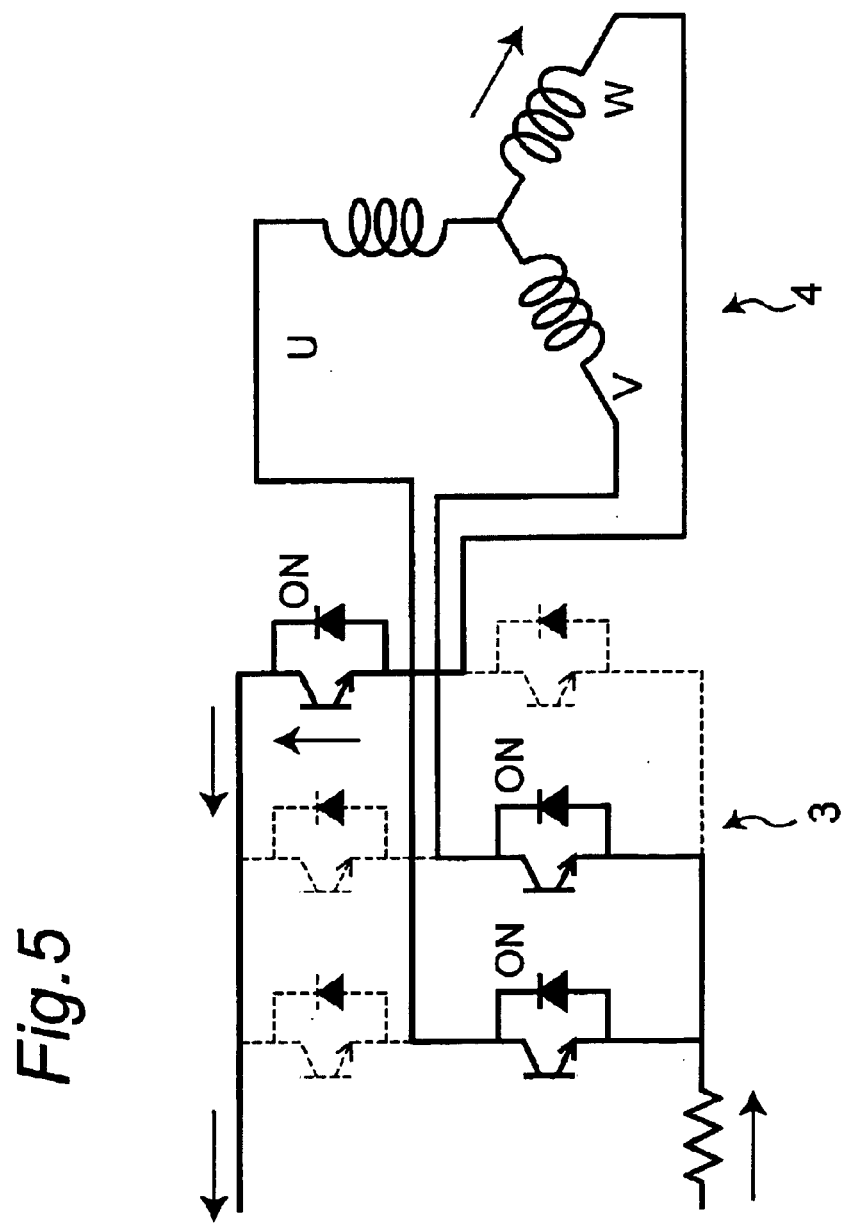
FIG. 5 is a diagram showing the current direction during operation in the first preferred embodiment of the invention.

FIG. 4 shows the operation result when the speed command ω* is near 100 Hz in the inverter control device for driving the induction motor of the invention. Referring to the period A in FIG. 4, the DC voltage $v_{pn}$ of the inverter 3 drops, and a phase W motor current $I_w$ flows in the negative direction, though the current $I_w$ naturally flows in positive direction as indicated by broken line. At this time, a current flows in regenerative direction as shown in FIG. 5, and an AC power source current $I_{ac}$ does not flow, and when this state continues, the cubic harmonic component increases.

To prevent increase of the cubic harmonic component, when the speed command ω* is near 100 Hz, the PN voltage correction coefficient $k_{pn}$ is determined in the second mode of the PN voltage corrector 16, and the corrected motor voltage commands $v_{uh}^*$, $v_{vh}^*$, $v_{wh}^*$ are calculated as shown in formula (5).

FIGS. 6A and 6B schematically show the first mode and second mode operation of the PN voltage corrector 16 when the speed command ω* is near 100 Hz.

As shown in FIG. 6B, in the second mode, the PN voltage correction coefficient $k_{pn}$ is lower than 1 from time to time, and the corrected motor voltage commands $v_{uh}^*$, $v_{vh}^*$, $v_{wh}^*$ are suppressed on such occasion, and therefore the peak of the AC power source current $I_{ac}$ is suppressed as compared with the first mode.

Figure 7:
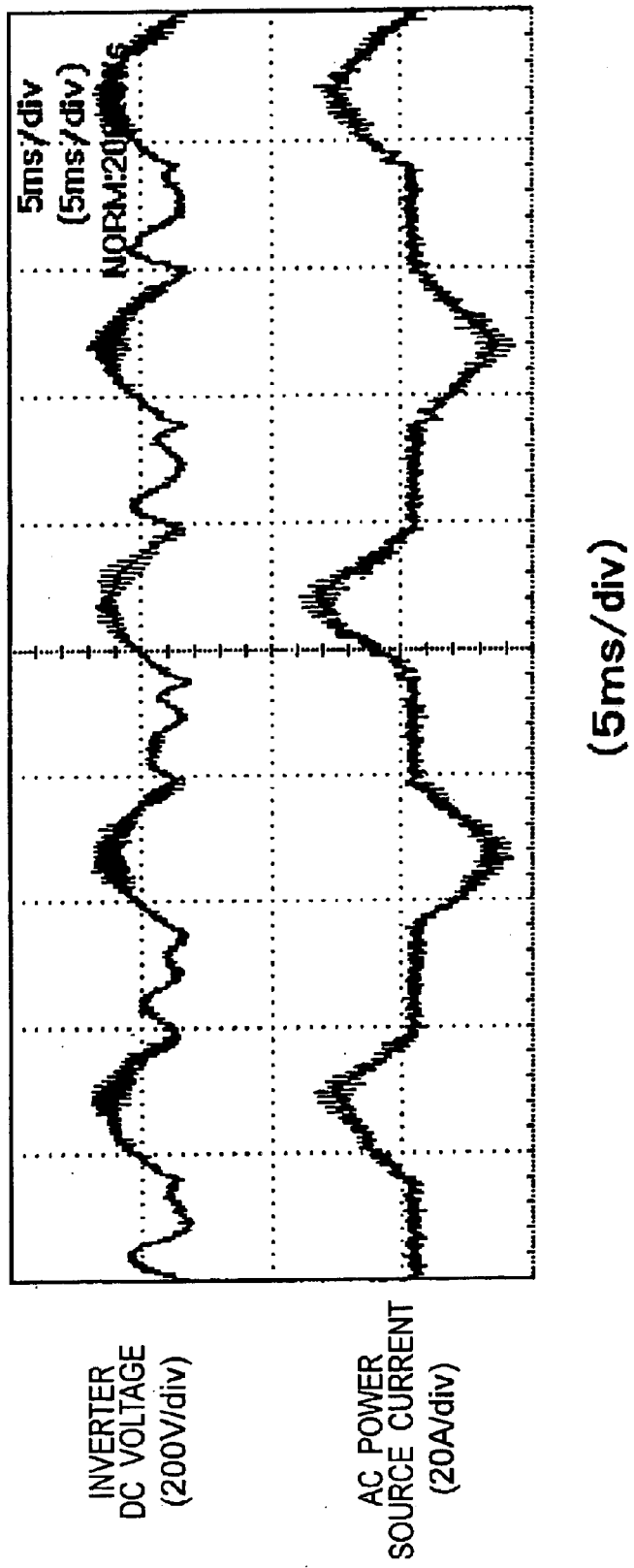
FIG. 7 is a diagram showing an operation result of the first mode of PN voltage corrector in the first preferred embodiment of the invention.
Figure 8:
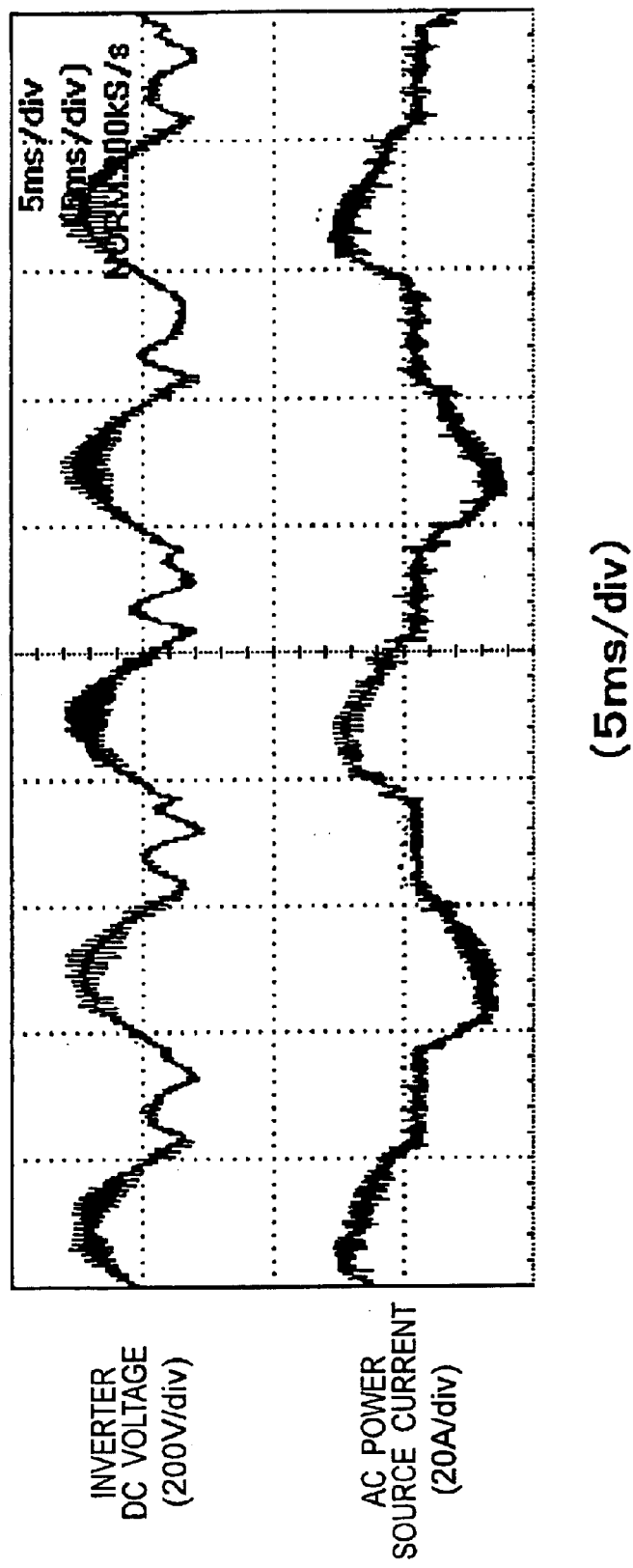
FIG. 8 is a diagram showing an operation result of the second mode of PN voltage corrector in the first preferred embodiment of the invention.

FIG. 7 shows an result of the operation in the first mode of the PN voltage corrector 16 when the speed command ω* is near 100 Hz, and FIG. 8 shows a result of the operation in the second mode.

Actually, in the second mode operation of the PN voltage corrector 16, the peak of the AC power source current $I_{ac}$ is suppressed, and thus the cubic harmonic component of the AC power source current can be decreased.

As mentioned above, combination use of the first mode and second mode of the PN voltage corrector 16 can provide the inverter control device for driving the induction motor that is capable to select either an operating region of maintaining stable driving of the induction motor, or an operating region of suppressing the cubic harmonic component of the AC power source current.

It should be noted that the present invention is not limited to the inverter control device for driving the induction motor by V/F control as mentioned in the this embodiment, but the invention may be also applied to an inverter control device for driving an induction motor by known vector control.

It should be noted that the invention can also be applied to the case where the speed sensor such as a pulse generator cannot be used as in the compressor driving motor in an air conditioner or the case of using a speed sensor such as a servo drive.

Embodiment 2

In this preferred embodiment, the reference DC voltage $V_{pn0}$ calculated by the reference DC voltage calculator 19 is varied depending on the speed command ω* of the induction motor 4 which is provided from outside.

Figure 9:
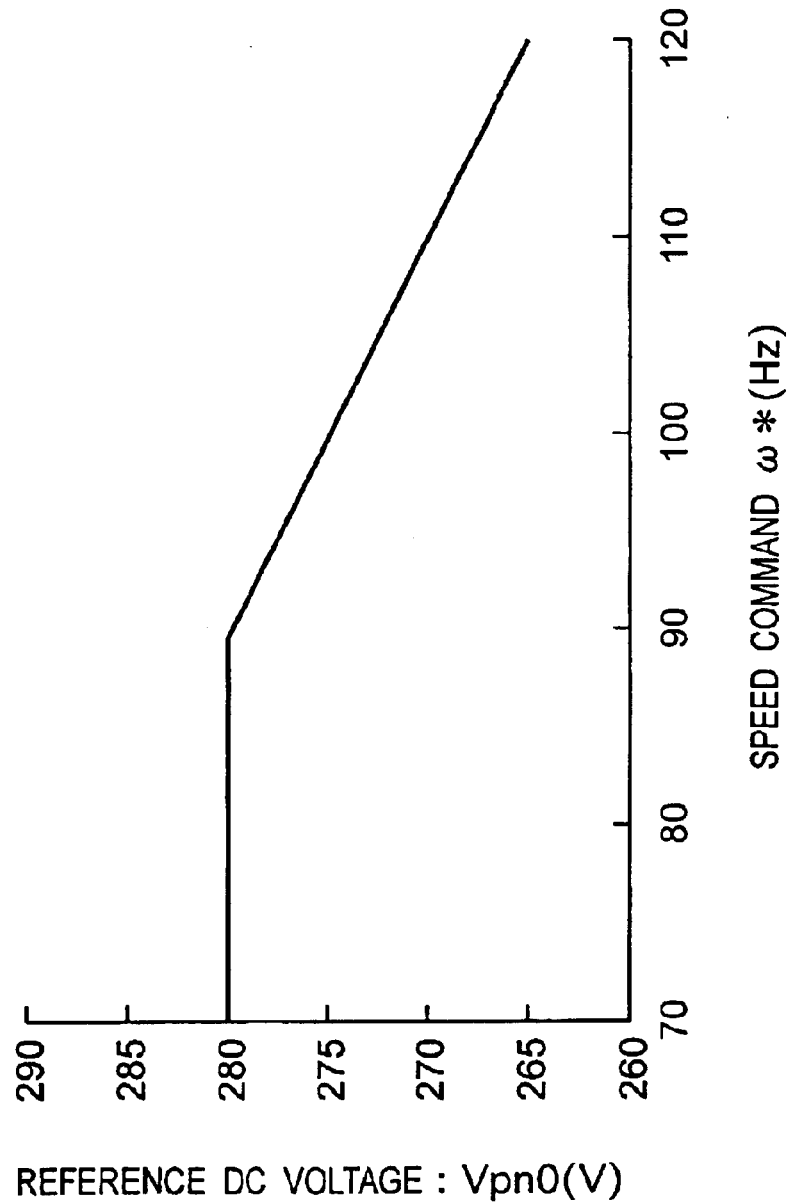
FIG. 9 is a diagram showing characteristics of the reference DC voltage in the second preferred embodiment of the invention.

FIG. 9 shows an example of change of the reference DC voltage $V_{pn0}$ calculated by the reference DC voltage calculator 19 depending on the speed command ω* of the induction motor 4 provided from outside.

FIGS. 10A and 10B show schematically the operation when the speed command ω* is 80 Hz and 100 Hz with the characteristics of the reference DC voltage calculator 19 shown in FIG. 9.

In the case of 100 Hz shown in FIG. 10B, as compared with the case of 80 Hz shown in FIG. 10A, the PN voltage correction coefficient $k_{pn}$ is lowered on the whole, and the corrected motor voltage commands $v_{uh}^*$, $v_{vh}^*$, $v_{wh}^*$ are suppressed.

Figure 11:
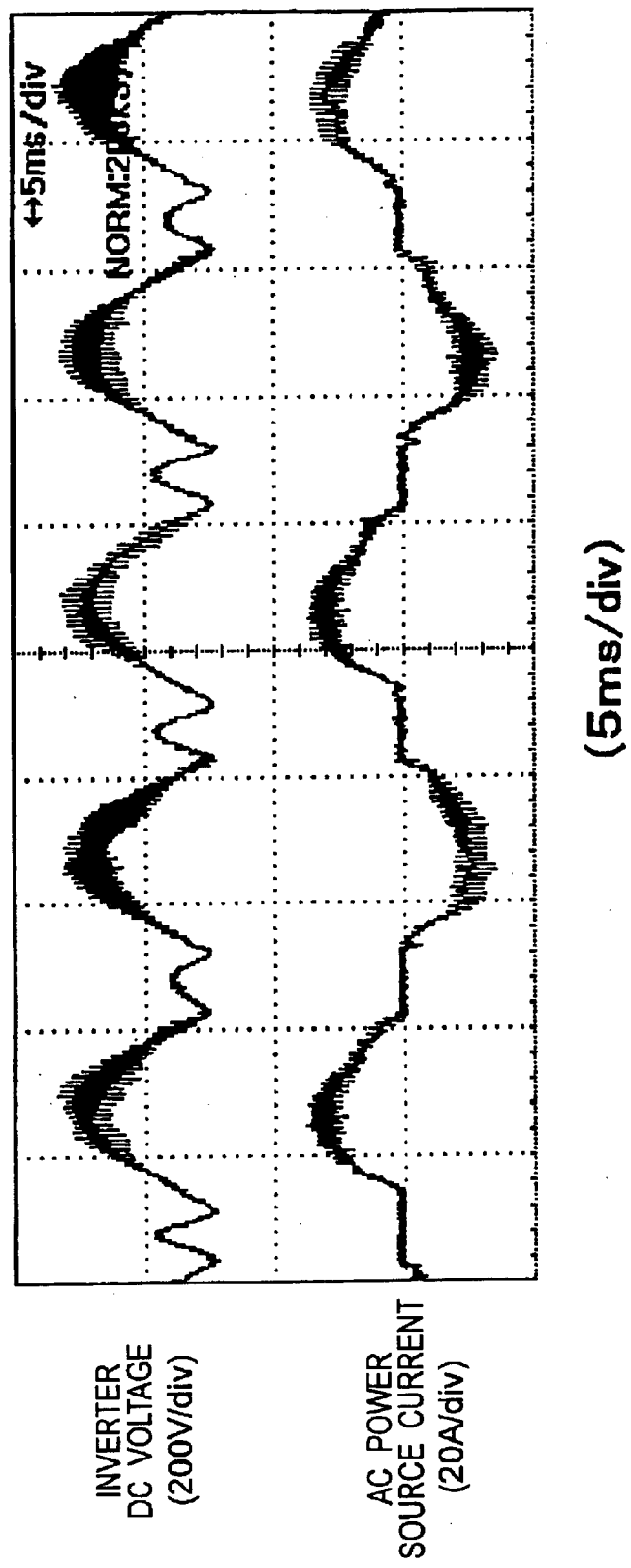
FIG. 11 is a diagram showing the operation result in the second preferred embodiment of the invention.

As a result, the induction motor 4 demands more voltage to be applied, and as shown in FIG. 11, the non-flowing period of the AC power source current $I_{ac}$ becomes shorter, and the cubic harmonic component of the AC power source current can be decreased.

Embodiment 3

A specific setting method of the operating frequency of the inverter according to the present invention is described below.

Figure 12:
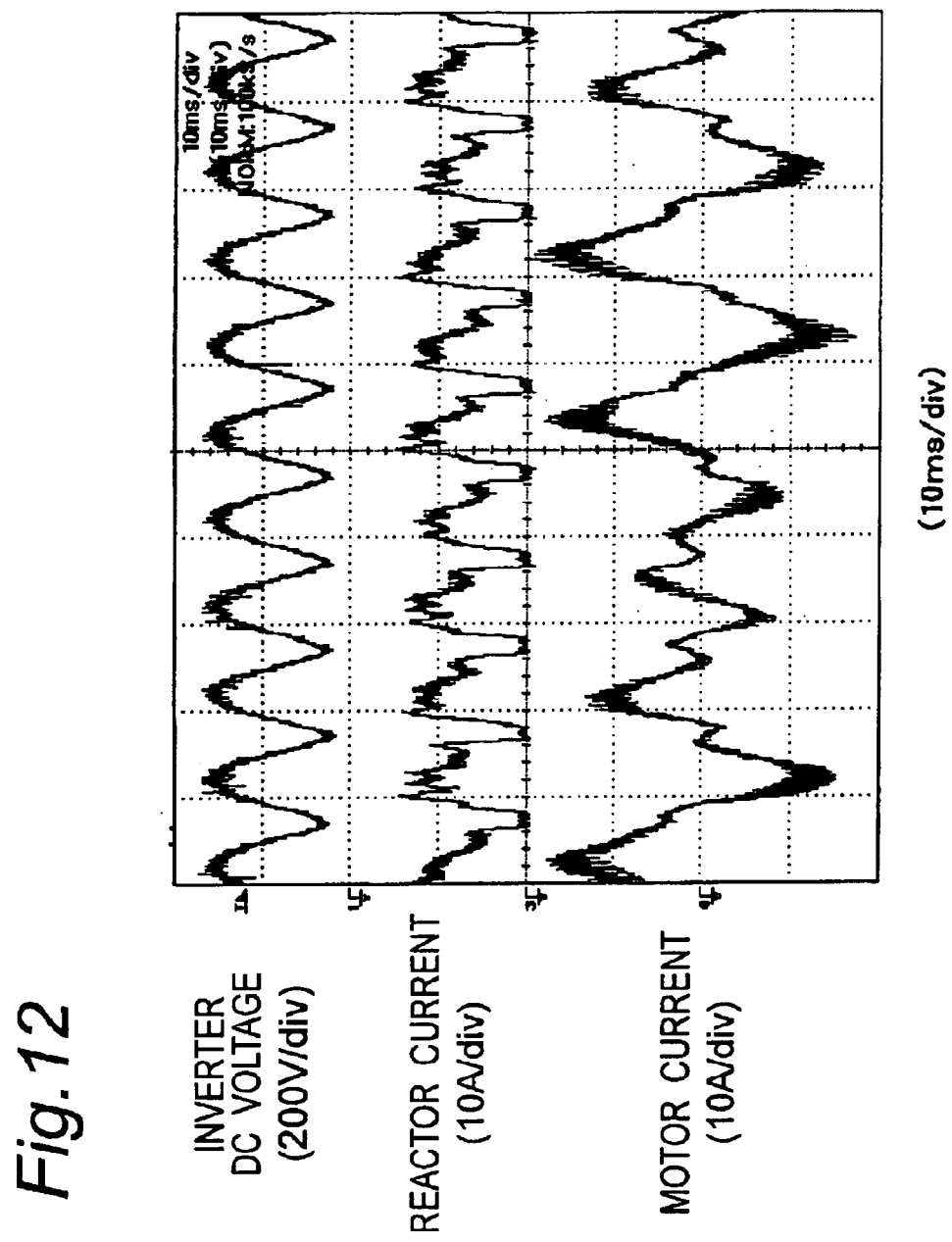
FIG. 12 is a diagram showing a first operation result of the inverter control device for driving the induction motor in the third preferred embodiment of the invention.

Since the inverter control device for driving the induction motor of the invention uses a capacitor with small capacity, the inverter DC voltage pulsates largely at a double frequency of the AC power source frequency $f_s$ as shown in FIG. 12.

Accordingly, at the frequency where the inverter operating frequency $f_1$ is an even number multiple of the AC power source frequency $f_s$, the inverter DC voltage is synchronized with the a pulsating frequency (a double frequency of the AC power source frequency $f_s$), and a resonance phenomenon takes place.

Figure 13:
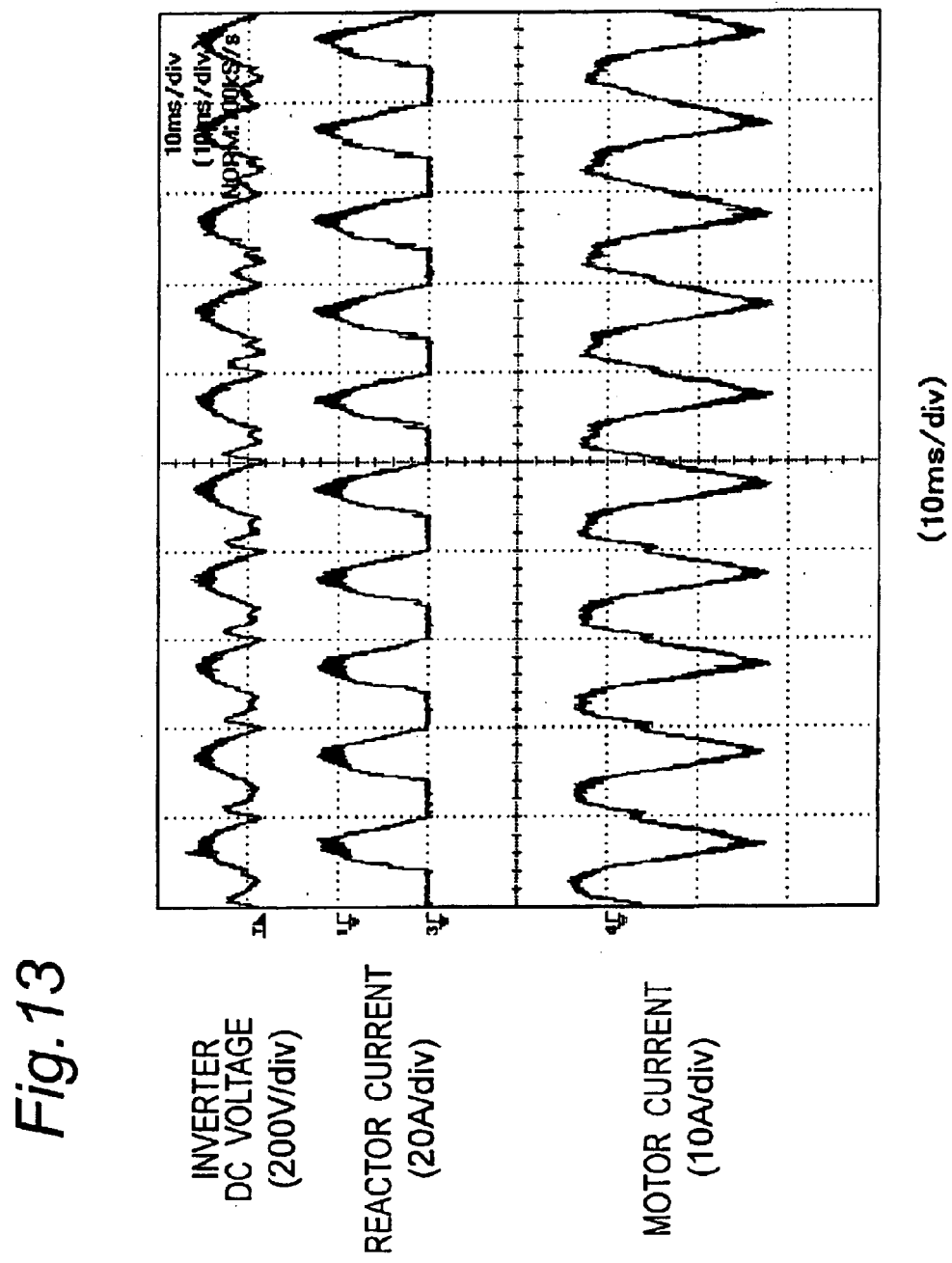
FIG. 13 is a diagram showing a second operation result of the inverter control device for driving the induction motor in the third preferred embodiment of the invention.

FIG. 13 shows the operation result when the inverter operating frequency $f_1$ is a double frequency of the AC power source frequency $f_s$. It is known that the inverter DC voltage synchronizes with the pulsating frequency to generate the resonance phenomenon, and a negative DC component is superposed on the motor current. As a result, a brake torque is generated in the induction motor, and adverse effects are caused, such as decrease of an output torque and increase of motor loss. In FIG. 13, the dimensions are as follows: the inductance of the small capacity reactor is 0.5 mH, the capacity of the small capacity capacitor is 10 μF, the AC power source is 220 V (50 Hz), the inverter operating frequency is 100 Hz (herein since the number of poles of the motor is 2, the inverter operating frequency and motor speed command are equal to each other), and the inverter carrier frequency is 5 kHz.

In this preferred embodiment, regarding setting of the inverter operating frequency $f_1$, the inverter operating frequency $f_1$ is determined so as to prevent the inverter operating frequency $f_1$ from stationary being fixed at the frequency (or frequency range) given in formula (6).

$$f_1 = 2nf_s \pm \Delta f \tag{6}$$

where n is an integer, and Δf is a predetermined frequency width, and the frequency width Δf is basically determined so as to decrease the effects of the resonance phenomenon.

If the inverter operating frequency $f_1$ exceeds the resonant frequency determined in formula (6), the inverter operating frequency f1 is changed instantly in a transient state of acceleration or deceleration, thereby preventing the inverter operating frequency $f_1$ from being fixed at the resonant frequency.

The frequency width Δf may not be always set, and depending on the operating status (such as light load), it may not be set (to be set at Δf=0 in this case).

Thus, by avoiding the resonance phenomenon of the inverter frequency and AC power source frequency, unstable action of the induction motor can be prevented, and stable driving can be realized.

Embodiment 4

The following is a specific method of determining dimensions of the small capacity capacitor 12 and small capacity reactor 11 used in the inverter control device of the invention.

For the inverter control device of the invention, in order to suppress harmonic components of the AC power source current and satisfy the IEC standard, the combination of the small capacity capacitor 12 and small capacity reactor 11 is determined so that the resonant frequency $f_{LC}$ (LC resonant frequency) determined by the small capacity capacitor and small capacity reactor may be more than 40 times of the AC power source frequency $f_s$.

Herein, using the capacity of the small capacity capacitor 12 to be C [F], and the inductance value of the small capacity reactor 11 to be L [H], the LC resonant frequency fLC is expressed in formula (7).

$$f_{LC} = \frac{1}{2\pi\sqrt{LC}} \quad (7)$$

That is, the combination of the small capacity capacitor 12 and small capacity reactor 11 is determined so as to satisfy the relation of $f_{LC} > 40 f_s$. This is because the IEC standard specifies up to the higher harmonics of degree of 40 in the harmonic components of the AC power source current.

By determining the combination of the small capacity capacitor 12 and small capacity reactor 11 as in the above method, harmonic components of the AC power source current can be suppressed, and the IEC standard can be satisfied.

The following is to explain the determination of capacity of the small capacity capacitor 12.

When the inverter 3 is stopped, the small capacity capacitor 12 absorbs the regenerative energy of the induction motor 4 (magnetic energy accumulated in the inductance component of the induction motor immediately before stopping), and the DC voltage of the inverter 3 elevates, and therefore the capacity of the small capacity capacitor 12 is determined so that the maximum value of the DC voltage at this time may be smaller than the withstand voltage of the component elements of the peripheral circuits of the inverter 3. As a result, breakdown of peripheral circuits can be prevented.

It should be noted that the inductance value of the small capacity reactor 11 can be determined automatically in the above method once the value of the small capacity capacitor 12 is determined.

Embodiment 5

The following is a specific method of setting the carrier frequency of the inverter 3 according to the invention.

In the inverter control device of the invention, amount of the electric energy accumulated in the small capacity capacitor 12 is small. In order to maintain driving of the induction motor when the electric energy is insufficient, magnetic energy of the small capacity reactor 11 must be used together. In this case, a waveform of the reactor current (the current after passing through the diode bridge, being approximately equal to the absolute value of the AC power source current) is largely influenced by the carrier frequency (chopping) of the inverter 3.

Therefore, the inverter control device of the invention sets the carrier frequency of the inverter 3 so that the power factor of the AC power source is a predetermined value.

Figure 14:
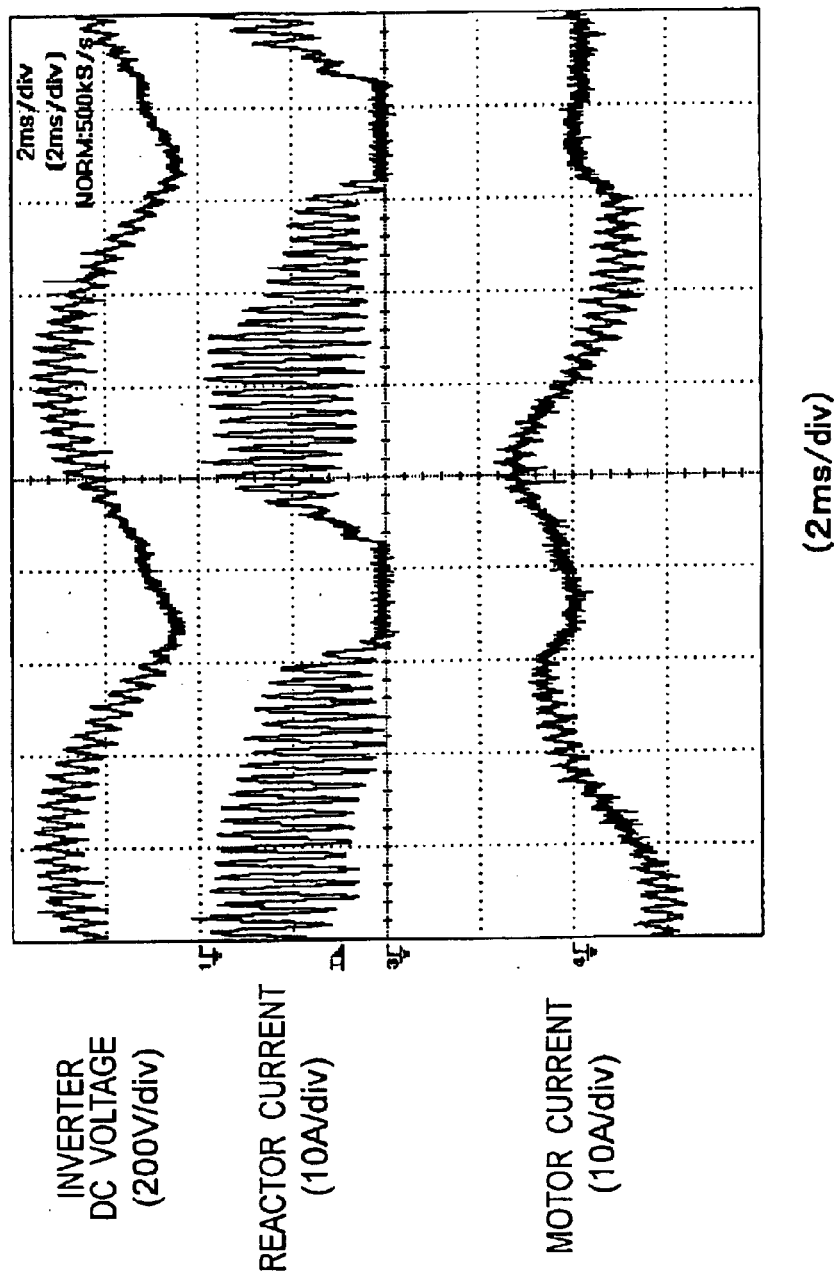
FIG. 14 is a diagram showing a first operation result of the inverter control device for driving the induction motor in the fifth preferred embodiment of the invention.
Figure 15:
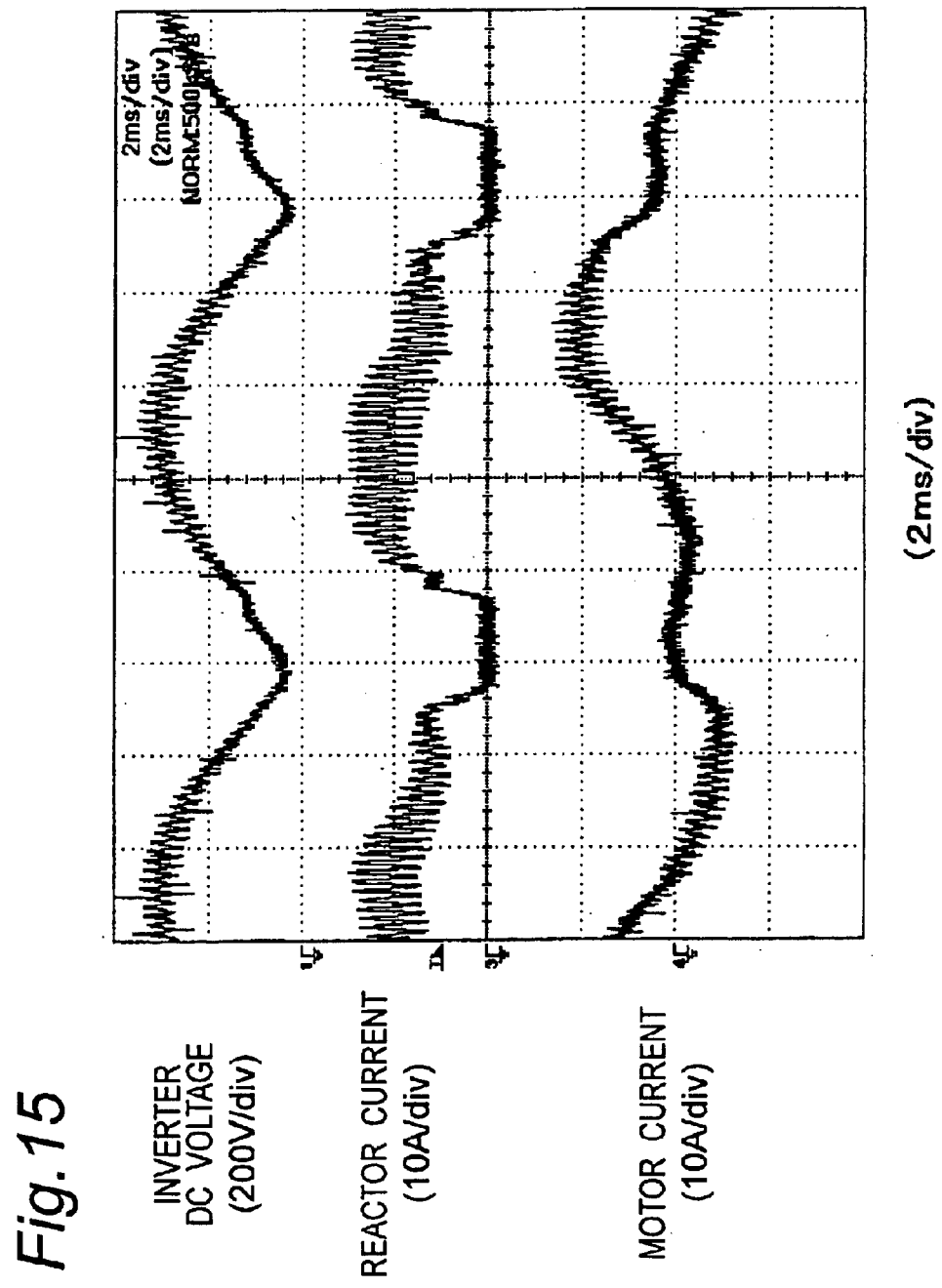
FIG. 15 is a diagram showing a second operation result of the inverter control device for driving the induction motor in the fifth preferred embodiment of the invention.
Figure 16:
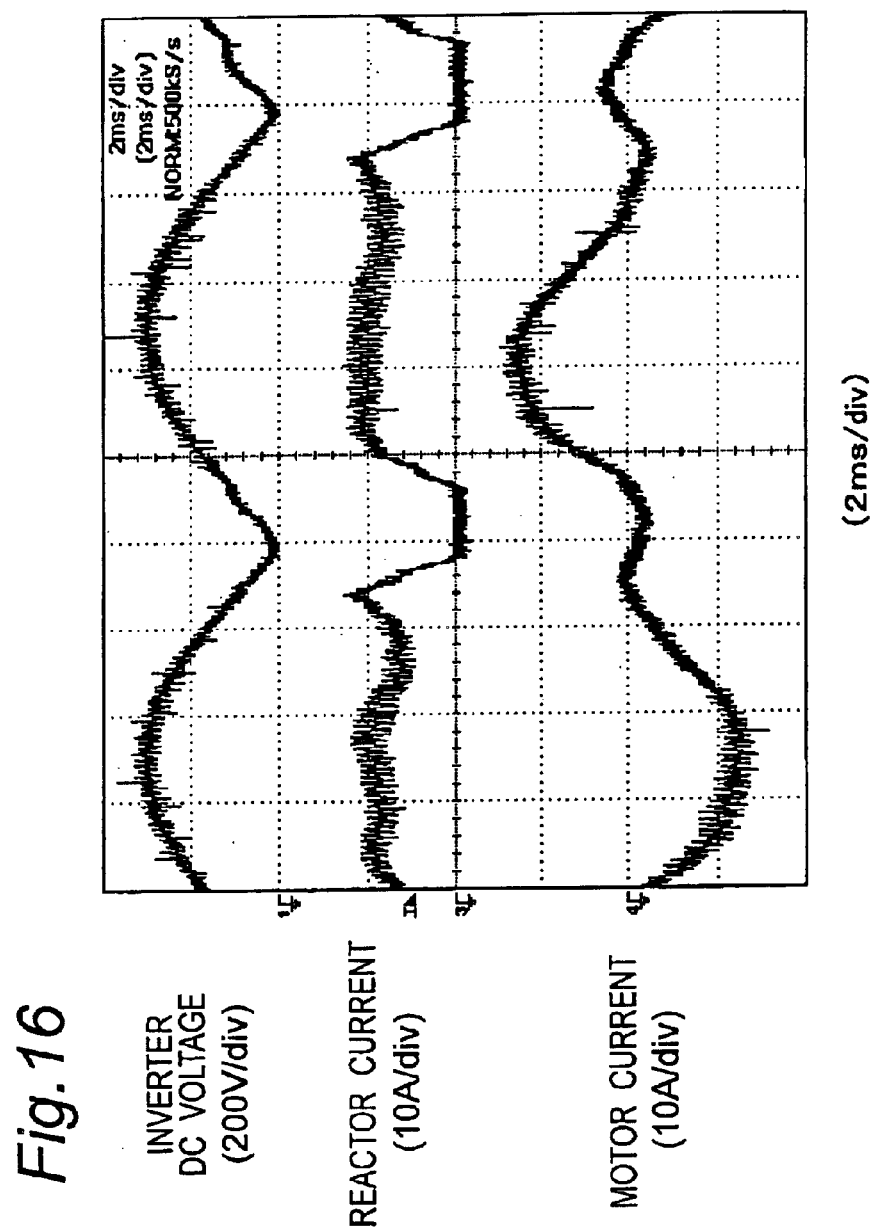
FIG. 16 is a diagram showing a third operation result of the inverter control device for driving the induction motor in the fifth preferred embodiment of the invention.

Results of operation of the inverter control device of the invention in various conditions are shown in FIG. 14 to FIG. 16. FIG. 14 shows the operation result at the carrier frequency of 3.3 kHz, FIG. 15 at 5 kHz, and FIG. 16 at 7.5 kHz, and comparing the reactor current waveforms, it is known that the reactor current (or AC power source current) depends largely on the carrier frequency.

The power factor of each AC power source was measured by a digital power meter, and it was 0.878 at the carrier frequency of 3.3 kHz in FIG. 14, 0.956 at 5 kHz in FIG. 15, and 0.962 at 7.5 kHz in FIG. 16.

At this time, the dimensions are as follows: the inductance of the small capacity reactor is 0.5 mH, the capacity of the small capacity capacitor is 10 μF, the AC power source is 220 V (50 Hz), the inverter operating frequency is 57 Hz (herein since the number of poles of the motor is 2, the inverter operating frequency and motor speed command are equal to each other), and the input power of the AC power source is 900 W.

Herein, when the predetermined power factor of the AC power source is 0.9, it is enough to set the carrier frequency to a frequency in a range between 3.3 kHz and 5 kHz, and finally the carrier frequency is set to the lowest value while satisfying the predetermined power factor of the AC power source (in this case, 0.9).

Thus, the predetermined power factor of the AC power source can be satisfied, and by setting the minimum required limit of the carrier frequency, the inverter loss can be suppressed to a minimum.

Embodiment 6

Figure 17:
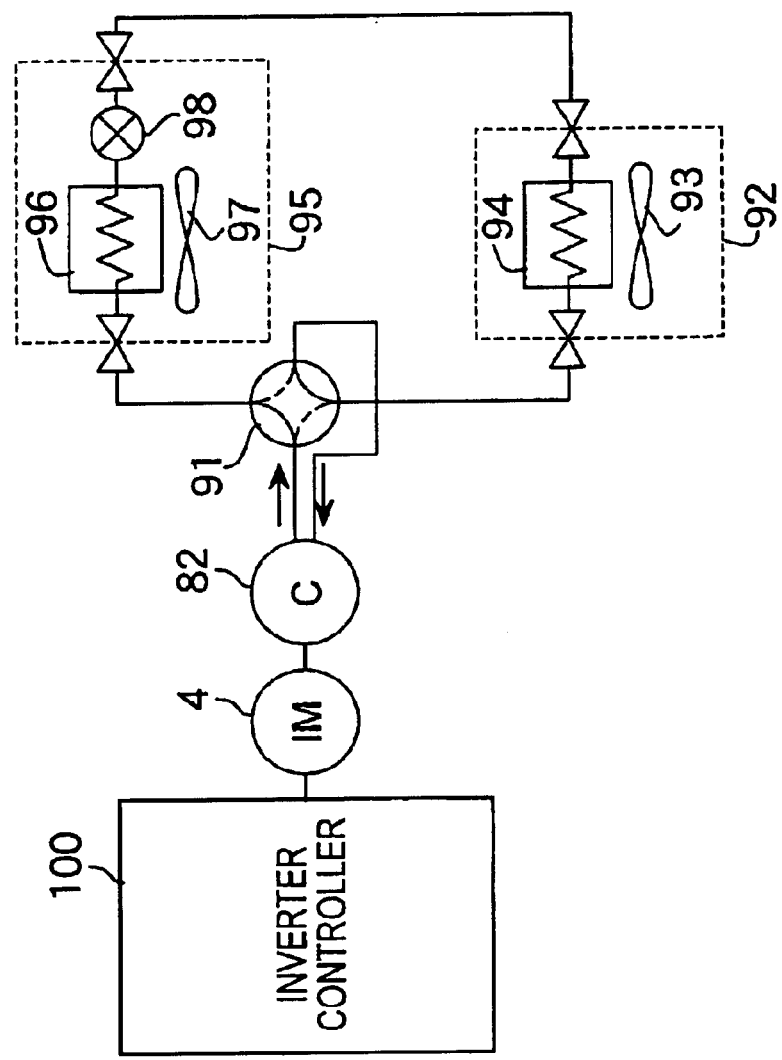
FIG. 17 is a block diagram showing a configuration of the preferred embodiment of the air conditioner according to the invention.

FIG. 17 shows a structural example of an air conditioner using the inverter control device described above. As shown in the diagram, the air conditioner uses the inverter control device 100 described above, and further includes a compressor 82, and a refrigeration cycle including an indoor unit 92, an outdoor unit 95, and a four-way valve 91. The indoor unit 92 includes an indoor blower 93 and an indoor heat exchanger 94, and the outdoor unit 95 includes an outdoor heat exchanger 96, an outdoor blower 97, and an expansion valve 98.

The compressor 82 is driven by the induction motor 4 which is driven by the inverter control device 100. Refrigerant which is a medium for conveying heat circulates in the refrigeration cycle. The refrigerant is compressed by the compressor 82, and is exchanged in heat with the outdoor air by the air blow from the outdoor blower 97 by means of the outdoor heat exchanger 96, and is further exchanged in heat with the indoor air by the air blow from the indoor blower 93 by means of the indoor heat exchanger 94.

It is understood that in the foregoing preferred embodiments, the induction motor is explained, but the invention may be also applied to other types of motors as well.

INDUSTRIAL APPLICABILITY

The invention presents an inverter control device for driving a motor with small size, light weight and low cost, and it is useful as a control device of a motor used in an air conditioner or the like.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application Nos. 2003-88439, filed on Mar. 27, 2003, and 2004-054287, filed on Feb. 27, 2004, which are expressly incorporated herein by reference in its entirety.

What is claimed is:

1. An inverter control device for driving a motor, including a rectifying circuit for converting an AC power from an AC power source into a DC power, and an inverter for converting the DC power from the rectifying circuit into an AC power of desired frequency and desired voltage to supply the AC power to a motor, the rectifying circuit including a diode bridge, and a reactor with a predetermined small capacity which is connected to the AC input end or DC output end of the diode bridge, the inverter control device having a capacitor with a predetermined small capacity for absorbing the regenerative energy of the motor between DC buses of the inverter, the inverter control device comprising:

a motor voltage command generator that generates a voltage command of each phase of the motor on the basis of a speed command of the motor given from outside;

a PN voltage detector that detects a DC voltage of the inverter;

a reference DC voltage calculator that determines a reference DC voltage of the inverter;

a PN voltage corrector that obtains PN voltage correction coefficient by dividing the reference DC voltage by the detected DC voltage; and a motor voltage command corrector that corrects the voltage command of each phase by multiplying the voltage command of each phase obtained by the motor voltage command generator with the PN voltage correction coefficient which is output from the PN voltage corrector, wherein the PN voltage corrector has a first mode which is used when the DC voltage value is more than the reference DC voltage and in which the PN voltage correction coefficient is set to one and a second mode in which the value obtained by dividing the reference DC voltage by the detected DC voltage is directly set to the PN voltage correction coefficient.

2. The inverter control device according to claim 1, wherein the reference DC voltage determined by the reference DC voltage calculator is variable depending on the speed command of the motor given from outside.

3. The inverter control device according to claim 2, wherein an inverter operating frequency is set so as to prevent the inverter operating frequency from stationary fixing in a frequency range having a predetermined margin around the resonant frequency which is a frequency of an even number multiple of AC power source frequency.

4. The inverter control device according to claim 2, wherein combination of the small capacity reactor and the small capacity capacitor is determined so that the resonant frequency of the small capacity reactor and the small capacity capacitor is larger than 40 times of the AC power source frequency.

5. The inverter control device according to claim 2, wherein the capacity of the small capacity capacitor is determined so that the maximum value of the DC voltage elevating when the inverter is stopped is smaller than withstand voltages of electric devices included in peripheral circuits of the inverter.

6. The inverter control device according to claim 2, wherein a carrier frequency of the inverter is determined so that a power factor value of the AC power source is a predetermined value.

7. An air conditioner comprising:

a compressor for compressing a refrigerant;

a motor for driving the compressor; and the inverter control device according to claim 2 for converting the DC power from the rectifying circuit into an AC power of variable voltage and variable frequency for supplying the AC power to the motor.

8. The inverter control device according to claim 1, wherein an inverter operating frequency is set so as to prevent the inverter operating frequency from stationary fixing in a frequency range having a predetermined margin around the resonant frequency which is a frequency of an even number multiple of AC power source frequency.

9. The inverter control device according to claim 1, wherein combination of the small capacity reactor and the small capacity capacitor is determined so that the resonant frequency of the small capacity reactor and the small capacity capacitor is larger than 40 times of the AC power source frequency.

10. The inverter control device according to claim 1, wherein the capacity of the small capacity capacitor is determined so that the maximum value of the DC voltage elevating when the inverter is stopped is smaller than withstand voltages of electric devices included in peripheral circuits of the inverter.

11. The inverter control device according to claim 1, wherein a carrier frequency of the inverter is determined so that a power factor value of the AC power source is a predetermined value.

12. An air conditioner comprising:

a compressor for compressing a refrigerant;

a motor for driving the compressor; and the inverter control device according to claim 1 for converting the DC power from the rectifying circuit into an AC power of variable voltage and variable frequency for supplying the AC power to the motor.

* * * * *